United States Patent
Takao et al.

(10) Patent No.: US 6,835,487 B2
(45) Date of Patent: Dec. 28, 2004

(54) STAINLESS STEEL SEPARATOR FOR FUEL CELLS, METHOD FOR MAKING THE SAME, AND SOLID POLYMER FUEL CELL INCLUDING THE SAME

(75) Inventors: Kenji Takao, Chiba (JP); Takeshi Yokota, Chiba (JP); Osamu Furukimi, Chiba (JP); Shin Ishikawa, Chiba (JP); Kazuhide Ishii, Chiba (JP); Shigeru Takano, Chiba (JP)

(73) Assignee: JFE Steel Corporation (JP)

( * ) Notice: Subject to any disclaimer, the term of this patent is extended or adjusted under 35 U.S.C. 154(b) by 126 days.

(21) Appl. No.: 10/078,737

(22) Filed: Feb. 19, 2002

(65) Prior Publication Data
US 2002/0160248 A1 Oct. 31, 2002

(30) Foreign Application Priority Data

Feb. 22, 2001 (JP) .................................... 2001-046594
Nov. 20, 2001 (JP) .................................... 2001-354340
Nov. 20, 2001 (JP) .................................... 2001-354341

(51) Int. Cl.$^7$ ........................ H01M 8/02; B21D 13/00; B21D 31/00
(52) U.S. Cl. ...................... 429/34; 429/30; 428/595; 72/379.2; 72/379.6
(58) Field of Search .................... 429/30, 34, 35, 429/36, 37, 38, 39; 72/379.2, 379.6; 428/595

(56) References Cited

U.S. PATENT DOCUMENTS

| | | | | |
|---|---|---|---|---|
| 4,796,946 A | * | 1/1989 | Wilson et al. ............ | 428/595 X |
| 6,379,476 B1 | | 4/2002 | Tarutani et al. ............ | 429/34 X |
| 6,440,598 B1 | * | 8/2002 | Fukui et al. ............ | 429/34 |
| 2002/0197518 A1 | * | 12/2002 | Blanchet et al. .......... | 429/34 X |

FOREIGN PATENT DOCUMENTS

| | | | |
|---|---|---|---|
| EP | 1 046 723 A1 | 10/2000 | ............ H01M/8/02 |
| JP | 2000-239806 | 9/2000 | ............ H01M/8/02 |
| JP | 3097690 | * 10/2000 | ............ H01M/8/02 |
| JP | 2000-328205 A | 11/2000 | |
| JP | P2001-32056 A | 2/2001 | |

OTHER PUBLICATIONS

English abstract for Japanese kokai 2001–032056 (Feb. 2001).*
English abstract for Japanese kokai2000–328205 (Nov. 2000).*

* cited by examiner

Primary Examiner—Stephen J. Kalafut
(74) Attorney, Agent, or Firm—Piper Rudnick LLP (57) ABSTRACT

A stainless steel separator having gas channels including grooves and projections for fuel cells. The separator has a composition including about 0.03 mass percent or less of carbon; about 0.03 mass percent or less of nitrogen, the total content of carbon and nitrogen being about 0.03 mass percent or less; about 16 mass percent to about 45 mass percent chromium; about 0.5 mass percent to about 3.0 mass percent molybdenum; and the balance being iron and incidental impurities. The separator has a contact resistance of about 100 mΩ·cm$^2$ or less. Preferably, the projections have an arithmetic average surface roughness Ra in the range of about 0.01 to about 1.0 μm and a maximum height Ry in the range of about 0.01 to about 20 μm. The stainless steel separator preferably further includes about 0.001 to about 0.1 mass percent silver. A fuel cell including this separator exhibits a stable output voltage for a long period of time.

30 Claims, 3 Drawing Sheets

STAINLESS STEEL SEPARATOR FOR FUEL CELLS, METHOD FOR MAKING THE SAME, AND SOLID POLYMER FUEL CELL INCLUDING THE SAME

BACKGROUND OF THE INVENTION

1. Field of the Invention

This invention relates to electric components formed of conductive stainless steel having high durability and low contact resistance. In particular, this invention relates to a stainless steel separator for fuel cells and a method for making the same. The invention also relates to a solid polymer fuel cell using the stainless steel separator, which may be used as a power source of an electric vehicle or as a compact distributed power source for home use, for example.

2. Description of the Related Art

Advanced countries are being strongly urged to reduce carbon dioxide emissions to prevent global warming. Thus, fuel cells not emitting carbon dioxide have been developed for environmental conservation. Fuel cells generate electricity by reaction of hydrogen with oxygen. A fuel cell basically has a sandwich structure including two separators for supplying hydrogen and oxygen, two electrodes (a fuel electrode and an air electrode), and an electrolyte membrane (ion-exchange membrane). Fuel cells are classified into phosphoric acid, molten sodium carbonate, solid electrolyte, alkaline, and solid polymer types depending on the types of electrolyte used.

Among them, solid polymer fuel cells have the following advantages compared with molten sodium carbonate and phosphoric acid fuel cells: (1) they can operate at a significantly low temperature of about 80° C.; (2) fuel cells with light and compact main frames can be designed; and (3) the fuel cells exhibit a short transient time, high fuel efficiency, and a high output density. Thus, solid polymer fuel cells have attracted attention as power sources for electric vehicles and as compact distributed power sources for home use.

Figure 2:
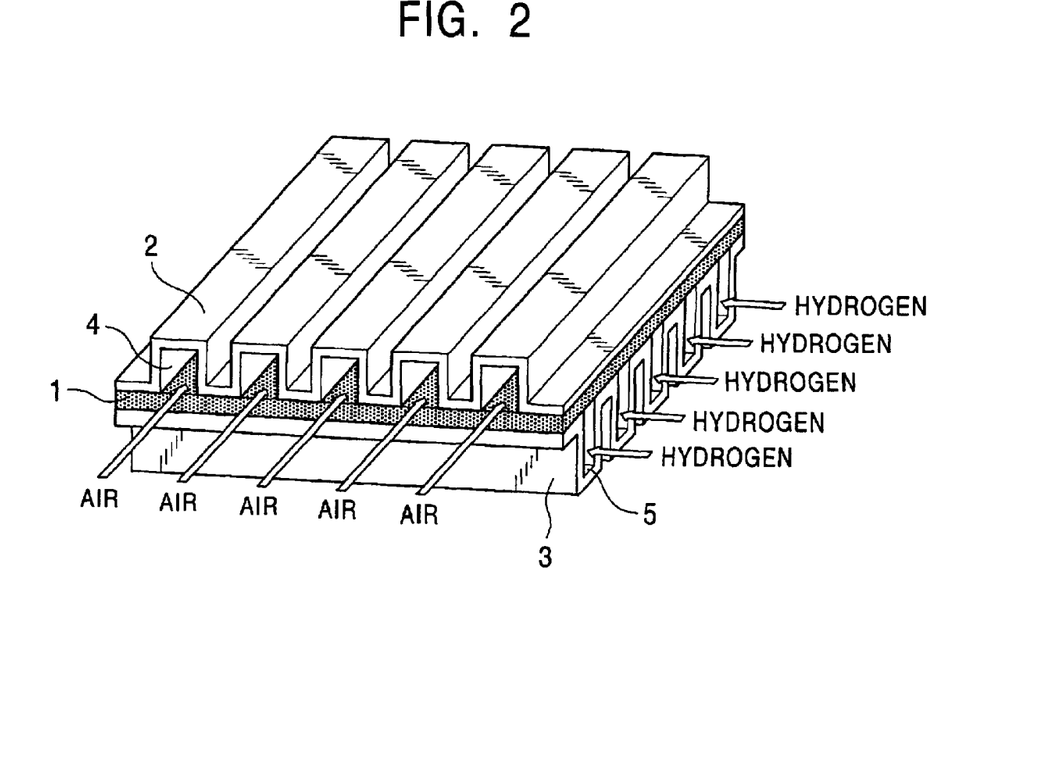
FIG. 2 is a schematic perspective view of a unit cell of a solid polymer fuel cell.

A solid polymer fuel cell generates electricity from hydrogen and oxygen through a polymer membrane, and has a structure shown in FIG. 2. A membrane-electrode assembly 1 with a thickness of several tens to several hundreds micrometers is sandwiched by separators 2 and 3 to form a unit cell which generates an electrical potential between the separators 2 and 3. The membrane-electrode assembly 1 is a composite of a polymer membrane and electrode supports on both surfaces of the polymer membrane. Each electrode support is formed of carbon cloth which supports an electrode material such as carbon black carrying a platinum catalyst. Several tens of to several hundreds of unit cells are connected in series to form a fuel cell stack.

The separators, which partition the unit cells, must function as (1) conductors carrying electrons generated; and (2) channels for oxygen (air) and hydrogen (air channels 4 and hydrogen channels 5 in FIG. 2) and channels for water and exhaust gas (air channels 4 and exhaust gas channels 5 in FIG. 2). Thus, each separator must have the following characteristics.

As the conductor, contact resistance between the separator and the electrode membrane is preferably as small as possible because the power generating efficiency of the fuel cell decreases with generation of Joule heat as the contact resistance increases. The separator, which functions as channels, requires workability to form these channels, air tightness, and corrosion resistance.

Regarding the durability of the fuel cells, the required lifetime of fuel cells for vehicles is about 5,000 hours and the required lifetime of stationary ones used as compact distributed power sources for home use is about 40,000 hours. Thus, the requirement for home use is much more severe than that for vehicles.

Solid polymer fuel cells in use include separators formed of carbonaceous materials. The carbonaceous separators have the advantage of relatively low contact resistance and no corrosion and the disadvantage of poor impact resistance, poor compactness, and high production costs for formation of channels. The high production costs are the greatest obstacle to the broad use of fuel cells. Thus, use of metallic materials, particularly stainless steels, instead of the carbonaceous materials has been attempted.

For example, Japanese Unexamined Patent Publication No. 8-180883 discloses a metal separator that can readily form a passivation film. Unfortunately, the passivation film increases the contact resistance of the separator, resulting in decreased power generating efficiency. Accordingly, the contact resistance and corrosion resistance of this metal must be improved.

Japanese Unexamined Patent Publication No. 10-228914 discloses a metallic separator plated with gold having low contact resistance to ensure high output. If the gold plated layer is thin, the plated layer inevitably has pinholes. If the gold plated layer is thick, the separator is expensive.

Japanese Unexamined Patent Publication No. 2000-277133 discloses a separator having improved contact resistance (conductivity). In this separator, carbon powder is distributed on a ferritic stainless steel substrate. However, the use of the carbon powder also causes an increase in surface treatment cost. If the surface treated separator is damaged during assembly, the corrosion resistance thereof decreases significantly.

Recently, there have been attempts to use plain stainless steel, which have not undergone surface treatment, in separators. For example, Japanese Unexamined Patent Publication Nos. 2000-239806 and 2000-294255 (corresponding to U.S. Pat. No. 3,097,689) disclose ferritic stainless steels for separators which intentionally contain Cu and Ni, and contain reduced amounts of impurities such as S, P, and N wherein $C+N \leq 0.03$ mass percent and 10.5 mass percent$\leq Cr+3 \times Mo \leq 43$ mass percent. Japanese Unexamined Patent Publication Nos. 2000-265248 and 2000-294256 (corresponding to U.S. Pat. No. 3,097,690) discloses a ferritic stainless steel for separators containing 0.2 mass percent or less of Cu and Ni to reduce dissolution of metallic ions and reduced amounts of impurities such as S, P, and N and satisfying the relationships, $C+N \leq 0.03$ mass percent and 10.5 mass percent$<Cr+3 \times Mo \leq 43$ mass percent.

These inventions are based on the idea that a firm passivation film is formed to suppress deterioration due to dissolved metallic ions in catalytic activity of the catalyst carried on the electrode for the purpose of suppression of an increase in contact resistance with the electrode due to the corrosion product when the stainless steel is used without treatment. Thus, the resistance itself of the stainless steel does not decrease. Furthermore, this stainless steel does not ensure generating durability over several tens of thousands of hours (resistance to a decrease in output voltage).

Since a fuel cell separator is subjected to pressing or cutting to form gas channels, the surface state (the state of the passivation film) of the steel strip or sheet cannot be maintained after the strip or sheet is shaped into a separator or after the separator is assembled into a fuel cell. Thus, a fuel cell separator obtained by the above process must keep satisfactory characteristics.

It would accordingly be advantageous to provide a conductive stainless steel electric component which is inexpensive, has low contact resistance comparable to that of a gold plate, and has high corrosion resistance. It would also be advantageous to provide a ferritic stainless steel for solid polymer fuel cell separators. If this stainless steel having low contact resistance and high corrosion resistance is used in separators without further surface treatment, the power generating efficiency of the fuel cell does not decrease for long periods of time.

SUMMARY OF THE INVENTION

According to an aspect of the invention, a stainless steel separator for fuel cells comprises gas channels including grooves and projections for partitioning the grooves, the separator having a composition comprising about 0.03 mass percent or less of carbon; about 0.03 mass percent or less of nitrogen, the total content of carbon and nitrogen being about 0.03 mass percent or less; about 16 mass percent to about 45 mass percent chromium; about 0.5 mass percent to about 3.0 mass percent molybdenum; and the balance being iron and incidental impurities, wherein the separator has a contact resistance of about 100 m$\Omega \cdot$cm$^2$ or less.

Preferably, the projections have an arithmetic average surface roughness Ra in the range of about 0.01 to about 1.0 $\mu$m and a maximum height Ry in the range of about 0.01 to about 20 $\mu$m.

Preferably, the stainless steel separator further comprises about 0.001 to about 0.1 mass percent silver.

Preferably, the stainless steel separator further comprises about 1.00 mass percent or less of silicon and about 1.00 mass percent or less of manganese.

Preferably, the stainless steel separator further comprises about 0.005 to about 0.5 mass percent vanadium.

Preferably, the stainless steel separator further comprises at least one of titanium and niobium in a total amount of about 0.01 to about 0.5 mass percent.

Preferably, the stainless steel separator is provided with a BA film having a thickness in the range of about 10 to about 300 nm on the surface of at least the projections.

According to another aspect of the invention, a method for making a stainless steel separator for fuel cells having gas channels including grooves and projections for partitioning the grooves, comprises the steps of hot-rolling a slab to form a hot-rolled sheet having a predetermined thickness, the slab comprising about 0.03 mass percent or less of carbon, about 0.03 mass percent or less of nitrogen, the total content of carbon and nitrogen being about 0.03 mass percent or less, about 16 mass percent to about 45 mass percent chromium, about 0.5 mass percent to about 3.0 mass percent molybdenum, and the balance being iron and incidental impurities; annealing and pickling the hot-rolled sheet; and cutting the hot-rolled sheet to form the stainless steel separator.

Preferably, the surface roughness of the projections is adjusted so that the arithmetic average surface roughness Ra is in the range of about 0.01 to about 1.0 $\mu$m and the maximum height Ry is in the range of about 0.01 to about 20 $\mu$m.

Alternatively, the method comprises the steps of hot-rolling a slab to form a hot-rolled sheet having a predetermined thickness, the slab comprising about 0.03 mass percent or less of carbon, about 0.03 mass percent or less of nitrogen, the total content of carbon and nitrogen being about 0.03 mass percent or less, about 16 mass percent to about 45 mass percent chromium, about 0.5 mass percent to about 3.0 mass percent molybdenum, and the balance being iron and incidental impurities; annealing and pickling the hot-rolled sheet; cold-rolling the hot-rolled sheet to form a cold-rolled sheet having a predetermined thickness; press-forming the cold-rolled sheet to form the stainless steel separator.

Preferably, the method further comprises the step of annealing and pickling the cold-rolled steel sheet.

Preferably, the surface roughness of the projections is adjusted so that the arithmetic average surface roughness Ra is in the range of about 0.01 to about 1.0 $\mu$m and the maximum height Ry is in the range of about 0.01 to about 20 $\mu$m.

Preferably, the stainless steel separator further comprises about 0.001 to about 0.1 mass percent silver.

Preferably, the surface roughness is adjusted by pickling the separator in aqua regia or an acid mixture before or after the cutting step. Alternatively, the surface roughness is adjusted during the press-forming step or by pickling the separator in aqua regia or an acid mixture before or after the press-forming step.

Preferably, the surface roughness is adjusted by the press-forming step wherein a mold used in this step has an arithmetic average surface roughness Ra in the range of about 0.01 to about 2.0 $\mu$m and a maximum height Ry in the range of about 0.01 to about 50 $\mu$m.

Preferably, the stainless steel separator further comprises about 1.00 mass percent or less of silicon and about 1.00 mass percent or less of manganese.

Preferably, the stainless steel separator further comprises about 0.005 to about 0.5 mass percent vanadium.

Preferably, the stainless steel separator further comprises at least one of titanium and niobium in a total amount of about 0.01 to about 0.5 mass percent.

Preferably, a BA film having a thickness in the range of about 10 to about 300 nm is formed on the surface of at least the projections of the stainless steel separator.

According to an aspect of the present invention, a solid polymer fuel cell comprises a polymer film, electrodes, and the above-mentioned separator.

DETAILED DESCRIPTION

We have intensively studied stainless steel separators having low contact resistance and high corrosion resistance with respect to the chemical components, surface shape, and surface oxide film, and have discovered that a separator formed of a Mo-containing ferritic stainless steel having high corrosion resistance and gas channels having surfaces with fine unevenness or roughness exhibits low contact resistance and that addition of a trace amount of silver significantly decreases contact resistance. We also have studied a method for significantly increasing the corrosion resistance while suppressing the contact resistance and have discovered that a thin BA (bright annealing) coating film formed on the separator is effective in high corrosion resistance and low contact resistance.

The experimental results serving as a foundation for the invention will now be described.

In Experiment 1, 0 to 0.5 mass percent silver was added to a ferritic stainless steel containing 0.004 mass percent carbon, 0.008 mass percent nitrogen, 0.2 mass percent silicon, 0.1 mass percent manganese, 29.5 mass percent chromium, 1.8 mass percent molybdenum, 0.02 mass percent phosphor, and 0.005 mass percent sulfur to prepare stainless steels. From each stainless steel, a cold rolled steel sheet having a thickness of 0.5 mm and a 2B-finished surface (JIS G 4305) was produced to measure the contact resistance.

Figure 1:
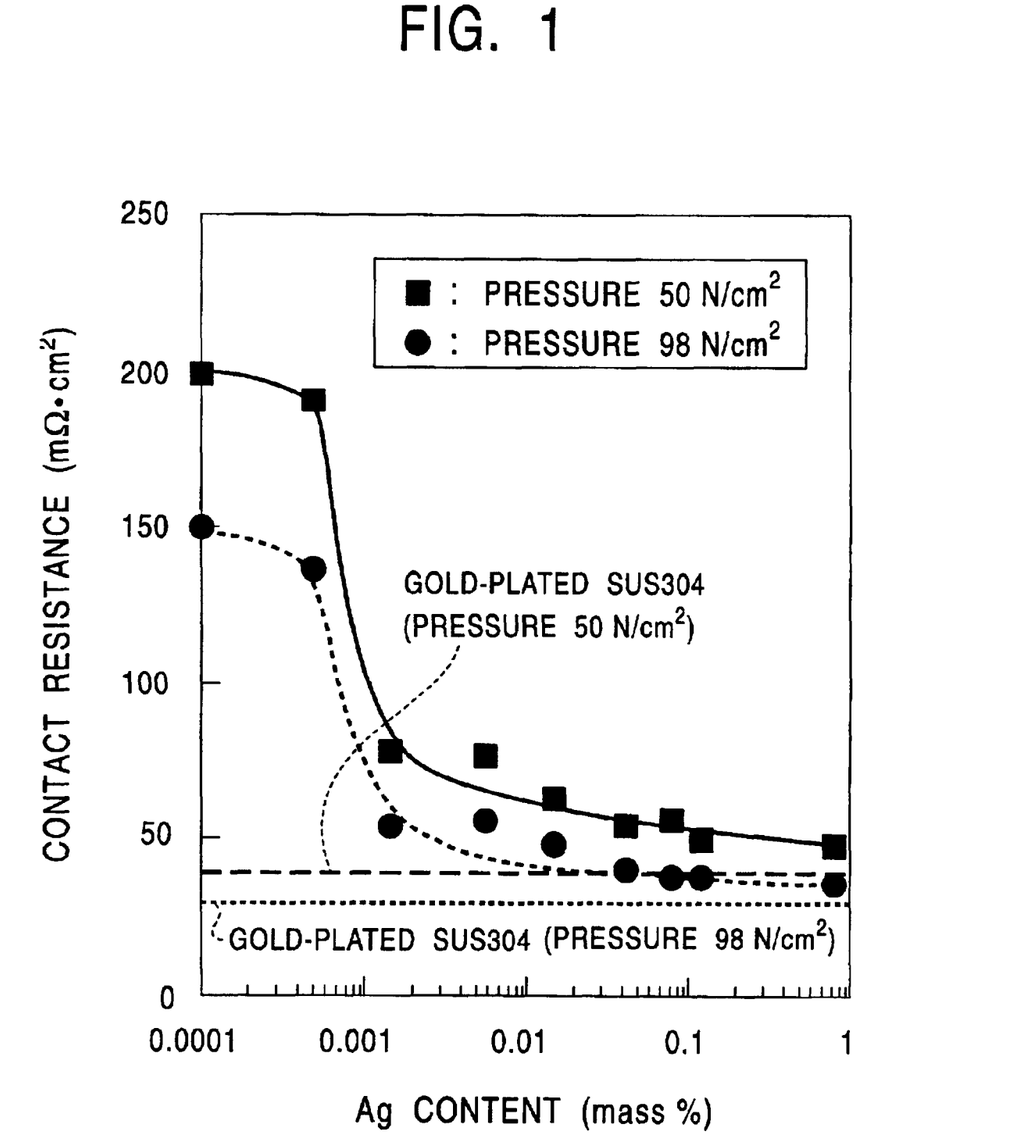
FIG. 1 is a graph illustrating the relationship between the contact resistance and the silver content in a ferritic stainless steel.

Contact resistance was measured as follows: A cut stainless steel with a length of 50 mm and a width of 50 mm was sandwiched between carbon cloth EC-CC1-060 made by ElectroChem, Inc., which were used as supporting substrates for electrode materials, and two electrodes of gold-plated copper sheets were attached to the stainless steel. A pressure of 98 N/cm$^2$ or 50 N/cm$^2$ was applied to the composite to measure the resistance between the two electrodes. FIG. 1 shows the contact resistance that corresponds to the measured resistance multiplied by the contact area (25 cm$^2$)

FIG. 1 shows that contact resistance significantly decreases to a level, which is substantially the same as that of a gold-plated SUS304 material, at a silver content exceeding 0.001 mass percent at both pressure of 98 N/cm$^2$ and 50 N/cm$^2$. According to the results of 50-cycle salt dry-wet combined corrosion test (spraying 5 mass percent NaCl for 0.5 hour, wetting at 60° C. and 95% humidity for 1 hour, and drying at 60° C. for 1 hour in each cycle), no corrosion occurred at a silver content of 0.1 mass percent or less. This corrosion level was the same as that of a silver-free steel sheet.

In Experiment 2, a stainless steel containing 0.004 mass percent carbon, 0.008 mass percent nitrogen, 0.2 mass percent silicon, 0.1 mass percent manganese, 29.5 mass percent chromium, 1.8 mass percent molybdenum, 0.02 mass percent phosphor, and 0.005 mass percent sulfur and a stainless steel containing the above components and 0.005 mass percent silver were prepared. From each stainless steel, a cold rolled steel sheet having a thickness of 0.5 mm and a 2B-finished surface (JIS G 4305) was produced.

Using each stainless steel, a separator was prepared by press forming. The separator had 17 channel projections in contact with an electrode film (a film-electrode composite) at a space of 2 mm. Each channel projection had a substantially rectangular cross-section, a width of 2 mm and a height of 2 mm. The separator was washed with aqua regia (a 1:3 by volume mixture of nitric acid and hydrochloric acid) to control the arithmetic average surface roughness Ra within the range of 0.1 to 0.3 μm and the maximum height Ry within the range of 0.5 to 1.0 μm. The roughness was measured in the longitudinal direction of the channel projection according to JIS B 0601.

Parts of the separators after adjusting the roughness were treated in a bright annealing furnace to form BA films with thicknesses in the range of 0 to 360 nm by varying the annealing temperature and time. Here, the BA film means a thin oxide film formed on the surface of the sheet during the bright annealing. The thickness of the BA film was measured by argon-sputtered glow discharge spectrometry. A time when the peak intensity of the emission spectrum assigned to oxygen reached 50% of the maximum value of the peak intensity of at the surface layer and a time when the peak intensity of the emission spectrum assigned to iron reached 50% of the maximum value of the peak intensity at the base metal were measured. The thickness of the film was determined by the product of the GDS sputtering rate for pure iron and the average of above two observed times.

For comparison, a SUS304 stainless steel separator having a gold plating layer with a thickness of 0.05 μm and having the above shape and a carbon separator having a thickness of 5 mm and 17 grooves with a width of 2 mm, a height of 2 mm, and an interval of 2 mm on one side and 16 lines of grooves with a width of 1 mm, a height of 2 mm, and a space of 3 mm on the other side were prepared.

The contact resistance and the corrosion resistance of these separators were measured as follows:

(Contact Resistance)

Figure 3:
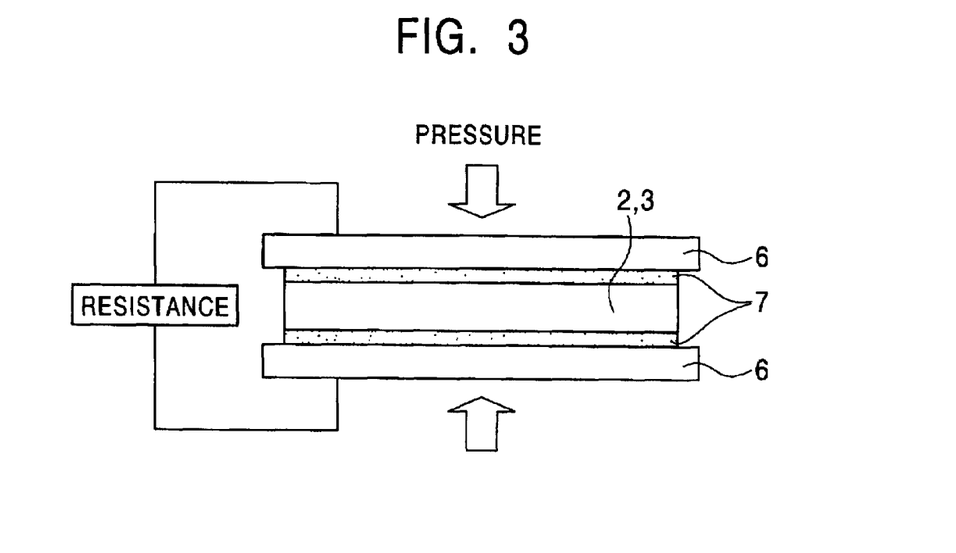
FIG. 3 is a schematic view of a method for measuring the contact resistance.

As shown in FIG. 3, separator 2 or 3 having grooves was sandwiched by square carbon cloths 7 with a side of 67 mm. In this experiment, three types of carbon cloth (paper) are used. One is EC-CCI-060 and the other two are EC-TPI-060T (Electro Chem, Inc.) and TGP-H-120 (Toray Industries, Inc.). Two gold-plated copper electrodes 6 were placed on the top and bottom and a pressure of 50 N/cm$^2$ was applied to measure the resistance between the two electrodes 6. The contact resistance was the product of the measured resistance and the contact area. The carbon cloths were placed to overlap the grooves. Since the contact areas differ from each other at the front and rear faces of the separator, the contact area used in this case was the average thereof. The contact resistance was an average of values for six stainless steel separators or for four gold-plated separators and carbon separators.

(Corrosion Resistance)

Although a corrosion test in 5 mass percent sulfuric acid according to JIS G 0591 is often employed to evaluate the corrosion resistance of stainless steel sheets used in metallic separators, this method is unsuitable for evaluating the durability over several tens of thousands of hours.

Thus, in the invention, a more severe corrosion test was performed. A carbon cloth was sandwiched between two grooved separators. These were tightened under a linear pressure of 9.8 N·m and immersed in a 10 mass percent sulfuric acid solution at 80° C. for 90 days. The weights of these separators were measured. The weight loss in the invention was the average of the weight losses per unit area of these two separators.

Figure 4:
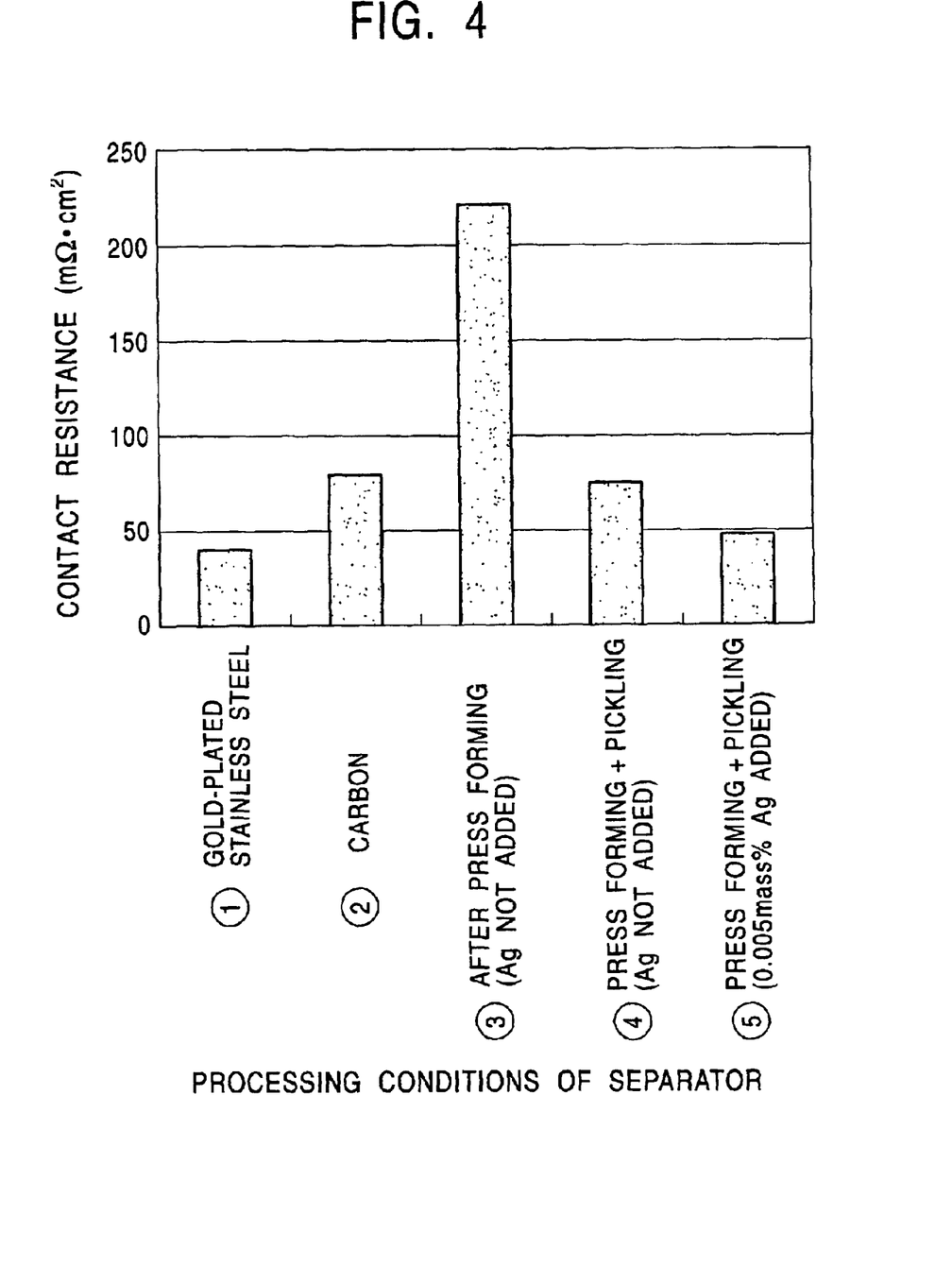
FIG. 4 is a graph illustrating the relationship between the contact resistance and processing conditions of a separator.

FIG. 4 is a graph illustrating the relationship between the contact resistance and processing conditions of a separator. Separators 4 and 5 each having a controlled surface roughness by pickling and having an adequate BA film exhibit satisfactorily low resistance, which is comparable to that of the carbon separator. In particular, Separator 5 containing silver exhibited significantly low contact resistance comparable to that of the gold-plated stainless steel separator. Separator 3 not having a controlled surface roughness exhibited significantly high contact resistance.

Table 1 shows that Separators 2 and 3, each having controlled surface roughness and an adequate BA film, exhibited satisfactory resistances which are equal to or less than that of the carbon separator. In particular, Separators 5 and 6 containing silver exhibited superior resistances comparable to that of the gold-plated stainless steel separator. In contrast, Separator 1 not subjected to pickling for controlling the surface roughness and Separator 7 having a thick BA film (362 nm) each had a significantly high contact resistance. Each of separators 1 and 4 having no BA films exhibited a larger weight loss due to corrosion, though the corrosion resistance thereof is superior to that of the gold-plated stainless steel separator.

These results demonstrate that the BA film having an adequate thickness is essential for compatibility between the corrosion resistance and the contact resistance and, particularly, for increased corrosion resistance.

The composition of the stainless steel separator according to the invention is as follows.

TABLE 1

| Separator | Ag content (mass %) | Pickling with aqua regia | BA film thickness (nm) | Contact resistance ($m\Omega \cdot cm^2$) a | b | c | Weight loss by corrosion ($g/cm^2$) |
|---|---|---|---|---|---|---|---|
| 1 | 0 | Not pickled | 0 | <u>194</u> | 1520 | 89 | 2.04 |
| 2 | 0 | Pickled | 24 | 70 | 558 | 32 | 0.44 |
| 3 | 0 | Pickled | 98 | 76 | 602 | 35 | 0.31 |
| 4 | 0.005 | Not pickled | 0 | 85 | 675 | 39 | <u>2.11</u> |
| 5 | 0.005 | Pickled | 28 | 52 | 410 | 24 | 0.51 |
| 6 | 0.005 | Pickled | 102 | 48 | 381 | 22 | 0.35 |
| 7 | 0.005 | Pickled | 362 | 157 | 1246 | 73 | 0.22 |
| 8 | Gold-plated stainless steel separator | | | 41 | 325 | 19 | <u>5.6</u> |
| 9 | Carbon separator | | | 76 | 603 | 36 | — |

* Values in column a, b and c are the measured resistance with carbon cloth (paper) EC-CCI-060, EC-TPI-060T and TPG-H-120, respectively.

C: about 0.03 mass percent or less, N: about 0.03 mass percent or less, and C+N: about 0.03 mass percent or less Both carbon and nitrogen react with chromium in the steel to precipitate chromium carbonitride in the grain boundary, resulting in decreased corrosion resistance. Thus, it is preferred that the contents of these elements be as small as possible. Corrosion resistance does not decrease at a C content of about 0.03 mass percent or less, a N content of about 0.03 mass percent or less, and a total content of C and N of about 0.03 mass percent or less. If the C+N content exceeds about 0.03 mass percent, the separator will crack during cutting. Accordingly, the stainless steel separator contains about 0.03 mass percent or less of carbon, about 0.03 mass percent or less of nitrogen, and about 0.03 mass percent or less in total of carbon and nitrogen. Preferably, the stainless steel separator contains about 0.015 mass percent or less of carbon, about 0.015 mass percent or less of nitrogen, and about 0.02 mass percent or less in total of carbon and nitrogen.

Si: about 1.00 mass percent or less

A large amount of silicon, which functions as a deoxidizing agent, causes hardening of the steel sheet and decreased ductility. Thus, the upper limit of the silicon content is about 1.00 mass percent and is preferably in the range of about 0.0005 to about 0.6 mass percent.

Mn: about 1.00 mass percent or less

Manganese reacts with sulfur to reduce the dissolved sulfur content. Thus, manganese suppresses segregation of sulfur at the grain boundary and prevents cracking of the steel sheet during hot rolling. The amount of manganese for achieving such purposes is about 1.00 mass percent or less, and preferably in the range of about 0.0005 to about 0.8 mass percent.

Cr: about 16 to about 45 mass percent

Chromium is an essential element for ensuring corrosion resistance of the stainless steel. At a chromium content of less than about 16 mass percent, the separator cannot be used for long periods of time. A chromium content exceeding about 45 mass percent decreases the toughness because of precipitation of the σ phase. Thus, the chromium content is in the range of about 16 to about 45 mass percent, preferably in the range of about 20 to about 45 mass percent, and more preferably about 22 to about 35 mass percent.

Mo: about 0.1 to about 3.0 mass percent

Molybdenum is an element contributing to improved crevice corrosion resistance of the stainless steel. The crevice corrosion resistance is not noticeably improved at a molybdenum content of less than about 0.1 mass percent and is saturated at a molybdenum content exceeding about 3.0 mass percent. Thus, the molybdenum content is in the range of about 0.1 to about 3.0 mass percent, preferably about 0.5 to about 3.0 mass percent, and more preferably about 1.0 to about 2.5 mass percent.

Ag: about 0.001 to about 0.1 mass percent

Silver is known as an antibacterial element, which suppresses an increase in the number of microorganisms, for example, in Japanese Unexamined Patent Publication Nos. 11-172379 and 11-12692. We discovered that addition of a trace amount of silver to stainless steel causes decreased contact resistance and high corrosion resistance. Such a decrease in contact resistance is noticeable at a silver content of about 0.001 mass percent or more. However, corrosion resistance decreases and contact resistance significantly increases after corrosion occurs at a silver content exceeding about 0.1 mass percent. Thus, about 0.001 to about 0.1 mass percent silver is added to a contact resistance of about 100 $m\Omega \cdot cm^2$ or less under a pressure of 50 $N/cm^2$. Preferably, the silver content is in the range of about 0.005 to about 0.07 mass percent.

V: about 0.005 to about 0.5 mass percent

Vanadium increases the corrosion resistance of the steel in a solution containing chlorides and makes silver disperse uniformly and finely during the production process of the steel making. The corrosion resistance increases at a vanadium content of about 0.005 mass percent or more and is saturated at a vanadium content exceeding about 0.5 mass percent. Thus, the vanadium content is in the range of about 0.005 to about 0.5 mass percent, preferably about 0.005 to about 0.3 mass percent, and more preferably more than about 0.2 to about 0.3 mass percent. Combined use of silver and vanadium is preferable because the combination thereof has synergetic effects of increased corrosion resistance and increased contact resistance of the final product.

Ti and Nb: about 0.01 to about 0.5 mass percent in total

Titanium and niobium fix carbon and nitrogen in the steel as carbonitrides, thereby improving press formability of the steel sheet. In the case of about 0.03 mass percent or less of carbon and nitrogen in total, the press formability is noticeably improved at a titanium and niobium total content of about 0.01 mass percent and saturated at a total content exceeding about 0.5 mass percent. Thus, at least one of titanium and niobium is added in a total amount of about 0.01 to about 0.5 mass percent and preferably about 0.02 to about 0.4 mass percent.

The steel sheet of the invention may contain calcium, magnesium, a rare earth metal, and boron, each in an amount of about 0.1 mass percent or less. Furthermore, the steel sheet may contain about 0.2 mass percent or less of aluminum to improve the deoxidizing rate in the molten steel and about 1 mass percent or less of nickel to improve toughness of the steel sheet. The balance of the steel is iron and incidental impurities.

Characteristics of the stainless steel separator of the invention will now be described.

a. Contact resistance between separator and carbon cloth as supporting substrate: about 100 m$\Omega\cdot$cm$^2$ or less under a pressure of 50 N/cm$^2$.

The loss due to the contact resistance becomes the joule heat, which does not contribute to generation of electricity. In particular, the power generating efficiency significantly decreases at a contact resistance of about 100 m$\Omega\cdot$cm$^2$ or more. Thus, the upper limit of the contact resistance is about 100 m$\Omega\cdot$cm$^2$ in the invention.

Carbon cloth is used to facilitate gas diffusion and supporting the electrode member. The carbon cloth is integrated with a membrane-electrode assembly (MEA) or sandwiched between the MEA and the separator. Contact resistances are known to very depending on the types of carbon cloth as demonstrated in Experiment 2 (Table 1). In the invention, the contact resistance is measured by using a carbon cloth EC-CC1-060 made by Electro Chem, Inc.

With reference to FIG. 3, the separator 2 or 3 is sandwiched by the carbon cloths 7. Two gold-plated copper electrodes 6 are placed on the top and bottom and force is applied to measure the resistance between the two electrodes 6. The contact resistance is the product of the measured resistance and the contact area. When the contact areas differ from each other at the front face and the rear face of the separator due to grooves formed by a press forming or cutting process, the pressure and the contact resistance is calculated using the averaged contact area thereof.

b. Surface roughness Ra: about 0.01 to about 1.0 $\mu$m and Ry: about 0.01 to about 20 $\mu$m As described above, the surface roughness of the metallic separator must be controlled to reduce the contact resistance thereof. Fine surface unevenness is effective for reducing the contact resistance. The contact resistance is equal to that of the carbon separator at an arithmetic average roughness Ra of about 0.01 $\mu$m or more, is saturated at a roughness of about 0.8 $\mu$m, and the contact resistance increases at a roughness exceeding about 1.0 $\mu$m. Thus, the arithmetic average roughness Ra is in the range of about 0.01 to about 1.0 $\mu$m and is preferably about 0.05 to about 0.8 $\mu$m to achieve a contact resistance of about 100 m$\Omega\cdot$cm$^2$ or less under a pressure of 50 N/cm$^2$.

If the maximum height Ry representing the magnitude of the unevenness exceeds about 20 $\mu$m, such unevenness acts as the origin of corrosion. Thus, the maximum height Ry must be about 20 $\mu$m or less. Though the maximum height Ry is preferably as small as possible, the lower limit thereof is set to about 0.01 $\mu$m in view of the balance with the surface roughness Ra. Accordingly, the maximum height Ry is in the range of about 0.01 to about 20 $\mu$m.

Surface roughness may be controlled by any method. Examples of the methods include grinding, polishing, shot blasting, laser processing, press forming, pickling, and photoetching. The methods suitable for mass production are press forming using a mold having a fine unevenness and pickling using hydrochloric acid or aqua regia. Pickling may be performed before or after the steel sheet is shaped into the separator. Pickling after the separator is prepared is preferable because a well-controlled surface roughness is readily prepared.

c. BA film thickness: about 10 to about 300 nm

In case of requiring significantly high corrosion resistance, the formation of a BA film with a thickness of about 10 to about 300 nm on the stainless steel surface is effective. If the thickness of the BA film is less than about 10 nm, the corrosion resistance does not substantially improve. If the thickness exceeds about 300 nm, the contact resistance increases. Thus, the thickness of the BA film is in the range of about 10 to about 300 nm and preferably about 20 to about 200 nm in view of the balance between the corrosion resistance and the contact resistance. Preferably, the BA film is formed after grooving and roughening the separator because the BA film may have defects or reduce the thickness thereof if the film is formed before grooving and roughening.

A method for making the separator of the invention will now be described.

The separator of the invention can be provided by any known method. For example, the steel is formed in a converter or an electric furnace and secondarily refined by a strongly-stirred vacuum oxygen decarbonization (SS-VOD) process. Continuous casting is preferable in view of productivity and the quality of the resulting slab. The slab is hot-rolled and the hot-rolled sheet is annealed at about 800° C. to about 1,150° C., pickled, and grooved by cutting to form a separator. In case of forming the separator by press forming, the annealed hot-rolled steel sheet is further cold-rolled to form a cold-rolled sheet. Preferably, the cold-rolled sheet is annealed at about 800° C. to about 1,150° C. and pickled.

After the gas channels are formed by press forming or cutting, the surface roughness of the separator is preferably adjusted by grinding, polishing, shot blasting, laser processing, press forming, pickling, or photoetching to produce the final separator product. If significantly high corrosion resistance is required due to a continuous operation for a long period of time, a BA film with a thickness of about 10 to about 300 nm is preferably formed at least on the surface of the projection of the separators by bright annealing to enhance the durability in a fuel cell in use.

EXAMPLE 1

Steels having compositions shown in Table 2 were prepared in a converter and by secondary refining (SS-VOD) and were continuously cast to form slabs with a thickness of 200 mm. Each slab was heated to 1,250° C. and hot-rolled to form a hot-rolled sheet with a thickness of 5 mm. The hot-rolled sheet was annealed at 850° C. to 1,100° C. and pickled.

The sheet was cold-rolled and the cold-rolled sheet annealed at 850° C. to 1,100° C. to form an annealed cold-rolled sheet with a thickness of 0.5 mm. The surface roughness was controlled by varying the immersion time of the cold-rolled sheet in an acid mixture (8 mass percent nitric acid and 2.5 mass percent hydrofluoric acid) in the pickling step.

Three square samples with a side of 200 mm were prepared by cutting from the center in the width direction and longitudinal direction of the resulting cold-rolled sheet and subjected to a contact resistance test and a corrosion test in diluted sulfuric acid. Separators were prepared by press forming from each steel sheet that exhibited satisfactory test results. Generating characteristics of a single cell including this separator were performed as follows.

(Contact Resistance Test)

Four square test pieces with sides of 50 mm were prepared by cutting each selected stainless steel sheet. As shown in FIG. 3, each test piece was sandwiched between two carbon cloths 7 having the same size and then with two gold-plated copper electrodes 6. A force of 98 N/cm$^2$ or 50 N/cm$^2$ was applied between the two electrodes 6 to measure the resistance between the electrodes 6. The contact resistance was the average of the resistances multiplied by the contact area of the four test pieces.

(Corrosion Resistance Test)

A corrosion test in 5 mass percent sulfuric acid was performed according to JIS G 0591. Each test piece used in the contact resistance test was immersed in 5 mass percent sulfuric acid at 80° C. for 7 days, and the weight of the test piece measured. The surface of the sample had been previously controlled by pickling. The weight loss was the average of the weight losses per unit area of the four samples.

vol. %) were supplied to the cathode side and the anode side, respectively, to measure generating characteristic for 100 hours. The generating characteristic was evaluated as an output voltage at a current density of 0.7 A/cm$^2$. The cell body was maintained at 75 ±1° C. and the internal temperature of the cell was maintained at 78±2° C. The MEA and the carbon cloth were replaced with new ones for every test.

As references, using a stainless steel sheet SUS304, stainless steel separators having the same shape were prepared and plated with gold (thickness: about 0.05 μm). Also, 5-mm thick carbon separators having 17 rows of grooves

TABLE 2

| Steel | Composition (mass %) | | | | | | | | | | | | | Remarks |
|---|---|---|---|---|---|---|---|---|---|---|---|---|---|---|
| | C | N | C + N | Si | Mn | P | S | Cr | Mo | Ag | V | Nb | Ti | |
| 1 | 0.0080 | 0.0088 | 0.0168 | 0.21 | 0.31 | 0.024 | 0.006 | <u>15.2</u> | 1.2 | 0.0030 | 0.06 | — | 0.1 | CE |
| 2 | 0.0034 | 0.0035 | 0.0069 | 0.20 | 0.17 | 0.020 | 0.003 | 22.3 | 1.7 | 0.0100 | 0.11 | 0.31 | — | EX |
| 3 | 0.0075 | 0.0062 | 0.0137 | 0.31 | 0.25 | 0.022 | 0.008 | 23.1 | 1.5 | 0.0090 | 0.13 | 0.32 | — | EX |
| 4 | 0.0042 | 0.0031 | 0.0073 | 0.20 | 0.22 | 0.019 | 0.004 | 22.9 | 1.6 | — | — | — | — | EX |
| 5 | 0.0091 | 0.0075 | 0.0166 | 0.29 | 0.21 | 0.025 | 0.006 | 23.6 | 1.8 | — | 0.10 | 0.25 | — | EX |
| 6 | 0.0026 | 0.0033 | 0.0059 | 0.18 | 0.19 | 0.021 | 0.004 | 29.7 | 2 | 0.0030 | 0.11 | — | 0.22 | EX |
| 7 | 0.0027 | 0.0021 | 0.0048 | 0.20 | 0.11 | 0.018 | 0.003 | 30.1 | 1.9 | 0.0420 | 0.11 | 0.16 | — | EX |
| 8 | 0.0033 | 0.0035 | 0.0068 | 0.19 | 0.15 | 0.020 | 0.004 | 29.8 | 1.8 | 0.0910 | 0.15 | 0.2 | — | EX |
| 9 | 0.0053 | 0.0064 | 0.0117 | 0.25 | 0.30 | 0.030 | 0.007 | 29.9 | 1.9 | <u>0.3500</u> | 0.10 | 0.15 | — | CE |
| 10 | 0.0029 | 0.0022 | 0.0051 | 0.22 | 0.21 | 0.019 | 0.006 | 30.2 | <u>0.03</u> | 0.0280 | 0.09 | 0.24 | — | CE |
| 11 | 0.0044 | 0.0031 | 0.0075 | 0.27 | 0.17 | 0.017 | 0.005 | 28.9 | 2.9 | 0.0050 | 0.13 | — | 0.18 | EX |
| 12 | <u>0.0420</u> | 0.0200 | <u>0.0620</u> | 0.25 | 0.21 | 0.027 | 0.004 | 29.5 | 2 | — | 0.06 | — | 0.21 | CE |
| 13 | 0.0210 | 0.0250 | <u>0.0460</u> | 0.24 | 0.25 | 0.028 | 0.003 | 29.1 | 2 | 0.0110 | 0.10 | — | 0.22 | CE |
| 14 | 0.0031 | 0.0054 | 0.0085 | 0.24 | 0.22 | 0.019 | 0.003 | 30.0 | 1.8 | 0.0120 | 0.10 | 0.31 | — | EX |
| 15 | 0.0003 | 0.0002 | 0.0005 | 0.002 | 0.001 | 0.001 | 0.0002 | 43.2 | 1.7 | 0.0080 | — | 0.09 | 0.07 | EX |

EX: Example of the Invention
CE: Comparative Example (Generating Characteristic Test using Unit Cell)

In some of the cold-rolled steel sheets shown in Table 2, two separators 2 and 3 were prepared from each sheet. A unit cell shown in FIG. 2 was prepared using a square membrane-electrode assembly (MEA) 1 with a side of 67 mm composed of the separators and Nafion (made by DuPont) as a polymer film. The separators 2 and 3 had 17 air channels 4 and 17 hydrogen channels 5, respectively, which were arranged at an interval of 2 mm. Each channel had a square cross-section with a width of 2 mm and a height of 2 mm. Air and ultra-high-purity hydrogen (purity: 99.9999 vol. %) were supplied to the cathode side and the anode side, respectively, to measure generating characteristic for 100 hours.

with a width of 2 mm, a height of 2 mm, and a space of 2 mm on one side and 16 lines of grooves with a width of 1 mm, a height of 2 mm, and a space of 3 mm on the other side were prepared. The generating characteristics of unit cells using these separators were measured according to the above conditions. Herein, each separator was arranged so that the width of the grooves was 2 mm at the side in contact with the electrode.

TABLE 3

| Steel | Surface roughness | | Contact resistance (mΩ · cm$^2$) | | Output per unit cell after 100 hours mV | Weight loss by corrosion g/m$^2$ | Remarks |
|---|---|---|---|---|---|---|---|
| | Ra μm | Ry μm | Pressure 50 N/cm$^2$ | Pressure 98 N/cm$^2$ | | | |
| 1 | 0.14 | 1.24 | 70 | 57 | Not measured | 0.16 | CE |
| 2 | 0.07 | 0.51 | 73 | 55 | 0.58 | 0.07 | EX |
| 3 | 0.16 | 1.68 | 67 | 48 | 0.60 | 0.07 | EX |
| 4 | 0.21 | 1.55 | 88 | 69 | 0.57 | 0.06 | EX |
| 5 | 0.18 | 1.18 | 77 | 62 | 0.58 | 0.07 | EX |
| 6 | 0.09 | 0.92 | 66 | 50 | 0.58 | 0.05 | EX |
| 6 | 0.42 | 5.34 | 63 | 48 | 0.62 | 0.06 | EX |
| 7 | 0.06 | 0.63 | 61 | 45 | 0.64 | 0.03 | EX |
| 7 | 0.19 | 2.02 | 56 | 43 | 0.66 | 0.04 | EX |
| 7 | 0.33 | 3.02 | 62 | 45 | 0.65 | 0.04 | EX |
| 8 | 0.08 | 0.87 | 61 | 45 | 0.62 | 0.05 | EX |
| 8 | 0.21 | 2.09 | 64 | 45 | 0.63 | 0.06 | EX |
| 9 | 0.27 | 2.65 | 67 | 48 | 0.41 | 0.09 | CE |
| 10 | 0.14 | 1.12 | 70 | 53 | Not measured | 0.12 | CE |
| 11 | 0.06 | 0.45 | 78 | 58 | 0.59 | 0.03 | EX |
| 12 | 0.22 | 1.84 | 63 | 48 | 0.29 | 0.13 | CE |
| 13 | 0.33 | 2.59 | 52 | 41 | Not measured | 0.13 | CE |

TABLE 3-continued

| Steel | Surface roughness Ra μm | Surface roughness Ry μm | Contact resistance (mΩ · cm²) Pressure 50 N/cm² | Contact resistance (mΩ · cm²) Pressure 98 N/cm² | Output per unit cell after 100 hours mV | Weight loss by corrosion g/m² | Remarks |
|---|---|---|---|---|---|---|---|
| 14 | 0.31 | 3.22 | 53 | 40 | 0.65 | 0.05 | EX |
| 15 | 0.11 | 0.97 | 64 | 45 | 0.61 | 0.02 | EX |
| Carbon | — | — | 58 | 43 | 0.67 | 0 | R |
| Gold-plated stainless steel | — | — | 48 | 35 | 0.64 | 0.13 | R |

EX: Example of the Invention
CE: Comparative Example
R: Reference

Table 3 shows the results of the tests. Each steel sheet according to the invention exhibited low contact resistance, comparable to that of the gold-plated stainless steel sheet, and high corrosion resistance. Furthermore, the separator made of this steel sheet maintained an output voltage comparable to those of the carbon separator and the gold-plated separator during the 100-hour generating test. Each of the low-chromium sheet (Steel 1), the high-molybdenum sheet (Steel 10), the high-carbon sheet (Steel 12), and the high-carbon/nitrogen sheet (Steel 12) exhibited a weight loss of 0.1 g/m² or more, which represents poor corrosion resistance. A high-silver sheet (Steel 9) exhibited a significant decrease in the output voltage after 100 hours.

EXAMPLE 2

Steels having compositions shown in Table 4 were prepared in a converter and by secondary refining (SS-VOD) and continuously cast to form slabs with a thickness of 200 mm. Each slab was heated to 1,250° C. and hot-rolled to form a hot-rolled sheet with a thickness of 5 mm. The hot-rolled sheet was annealed at 850° C. to 1,100° C. and pickled. The hot-rolled sheet was used for forming separators by cutting or press forming in some cases. In the case of press forming, the sheet was cold-rolled and the cold-rolled sheet was annealed at 850° C. to 1,100° C. and pickled for descaling to form an annealed cold-rolled sheet with a thickness of 0.5 mm.

Separators were prepared using each hot-rolled or cold-rolled steel sheet by cutting or press forming. As shown in FIG. 2, each separator had gas channels (air channels 4 and hydrogen channels 5) arranged at an interval of

TABLE 4

| Steel | C | N | C + N | Si | Mn | P | S | Cr | Mo | Ag | V | Nb | Ti | Remarks |
|---|---|---|---|---|---|---|---|---|---|---|---|---|---|---|
| 1 | 0.0034 | 0.0035 | 0.0069 | 0.200 | 0.170 | 0.020 | 0.0030 | 22.3 | 1.7 | — | — | — | — | EX |
| 2 | 0.0075 | 0.0062 | 0.0137 | 0.310 | 0.250 | 0.022 | 0.0080 | 23.1 | 1.5 | — | 0.13 | — | — | EX |
| 3 | 0.0094 | 0.0082 | 0.0176 | 0.290 | 0.220 | 0.025 | 0.0040 | 21.7 | 1.8 | — | 0.09 | 0.29 | — | EX |
| 4 | 0.0026 | 0.0033 | 0.0059 | 0.180 | 0.190 | 0.021 | 0.0040 | 29.7 | 2.0 | 0.0105 | 0.11 | — | 0.22 | EX |
| 5 | 0.0027 | 0.0021 | 0.0048 | 0.200 | 0.110 | 0.018 | 0.0030 | 30.1 | 1.9 | 0.0021 | 0.11 | 0.16 | — | EX |
| 6 | 0.0033 | 0.0035 | 0.0068 | 0.190 | 0.150 | 0.020 | 0.0040 | 29.8 | 1.8 | 0.0910 | 0.15 | 0.20 | — | EX |
| 7 | 0.0029 | 0.0022 | 0.0051 | 0.220 | 0.210 | 0.019 | 0.0060 | 30.2 | — | 0.0280 | 0.09 | 0.24 | — | CE |
| 8 | 0.0044 | 0.0031 | 0.0075 | 0.270 | 0.170 | 0.017 | 0.0050 | 28.9 | 2.9 | 0.0050 | 0.13 | — | 0.18 | EX |
| 9 | 0.0520 | 0.0210 | 0.0730 | 0.240 | 0.210 | 0.028 | 0.0040 | 29.5 | 2.1 | 0.0110 | 0.09 | — | 0.20 | CE |
| 10 | 0.0250 | 0.0270 | 0.0520 | 0.260 | 0.190 | 0.024 | 0.0030 | 29.6 | 2.0 | 0.0140 | 0.10 | — | 0.19 | CE |
| 11 | 0.0031 | 0.0054 | 0.0085 | 0.240 | 0.220 | 0.019 | 0.0030 | 30.0 | 1.8 | 0.0040 | 0.10 | 0.31 | — | EX |
| 12 | 0.0003 | 0.0002 | 0.0005 | 0.002 | 0.001 | 0.001 | 0.0002 | 43.2 | 1.7 | 0.0080 | 0.009 | 0.09 | 0.07 | EX |

EX: Example of the Invention
CE: Comparative Example 2 mm, each channel having a square cross-section with a side of 2 mm. Each separator had an effective generation area of 45 cm² (groove forming area, 67 mm width 67 mm length). In case of cutting, 16 grooves with a width of 1 mm and a height of 2 mm were formed at an interval of 3 mm on the reverse face. Before and after the cutting, the separator was pickled with aqua regia (mixture of 1:3 nitric acid/hydrochloric acid) or an acid mixture of 8 mass percent nitric acid and 2.5 mass percent hydrofluoric acid to adjust the surface roughness.

Separators having the same shape of channels and an effective generation area of 45 cm² were formed by press forming and pickled with aqua regia or the above acid mixture to adjust the surface roughness (Separators 2, 7, and 8 in Table 5). In Separators 9, 13, 16, 17, and 19 in Table 5, the surface roughness was adjusted using a press mold having a surface with fine unevenness. Regarding the surface roughness of the press mold, Ra was 0.8 μm and Ry was 5.6 μm for Press 1, Ra was 2.1 μm and Ry was 16.5 μm for Press 2, and Ra was 3.3 μm and Ry was 52.7 μm for Press 3. The methods for making the separators are summarized in Table 5.

As references, using a stainless steel sheet SUS304, stainless steel separators (Separator 22 in Table 5) having the same shape were prepared and plated with gold (thickness: about 0.05 μm). Furthermore, 5-mm thick carbon separators (Separator 21 in Table 5) having 17 rows of grooves with a width of 2 mm, a height of 2 mm, and a space of 2 mm on one side and 16 lines of grooves with a width of 1 mm, a height of 2 mm, and a space of 3 mm on the other side were prepared. Four separators were prepared for each steel sheet, material, or shaping process.

The contact resistance of each separator was prepared by the method described below. The corrosion resistance of two separators among the four separators was measured in diluted sulfuric acid. The remaining two separators were assembled into a solid polymer fuel cell (unit cell), and the generating characteristic of the unit cell after 1,000 hour was measured.

(Contact Resistance Test)

The grooved separator 2 or 3 as shown in FIG. 3 was sandwiched between square carbon cloths 7 having a side of 67 mm and then with two gold-plated copper electrodes 6. A force of 50 N/cm² was applied between the two electrodes 6 to measure the resistance between the electrodes 6. The contact resistance was the average of the resistances multiplied by the contact area of the four test pieces. In each test pieces, the front face and the rear face had different contact areas for the carbon cloths. Thus, the average thereof was used as the contact area of each test piece.

(Corrosion Resistance Test)

A corrosion test in 10 mass percent sulfuric acid was performed according to JIS G 0591. Two test pieces for each separator were immersed in 10 mass percent sulfuric acid at 80° C. for 90 days, and the weight of the test piece measured. The weight loss was the average of the weight losses per unit area of these two test pieces.

TABLE 5

| Separator | Steel | Method for shaping separator* | Surface roughening method** | Surface roughness Ra μm | Surface roughness Ry μm | Contact resistance mΩ·cm² | Decrease in output per unit cell after 1,000 hours V/1,000 hr | Weight loss by corrosion g/m² | Remarks |
|---|---|---|---|---|---|---|---|---|---|
| 1 | 1 | Cutting | Pickling with acid mixture (A) | 0.12 | 0.94 | 71 | 0.03 | 0.31 | EX |
| 2 | 1 | Press 1 | Pickling with aqua regia (A) | 0.52 | 2.36 | 65 | 0.02 | 0.12 | EX |
| 3 | 2 | Cutting | Pickling with acid mixture (A) | 0.31 | 2.97 | 67 | 0.03 | 0.21 | EX |
| 4 | 3 | Cutting | Pickling with acid mixture (A) | 0.07 | 0.51 | 75 | 0.03 | 0.31 | EX |
| 5 | 3 | Cutting | Non | 3.2 | 4.6 | 242 | Initial output voltage <0.3 V | 0.12 | CE |
| 6 | 4 | Cutting | Pickling with aqua regia (A) | 0.15 | 1.02 | 57 | <0.01 | 0.09 | EX |
| 7 | 4 | Press 1 | Pickling with acid mixture (A) | 0.64 | 1.94 | 87 | 0.02 | 0.22 | EX |
| 8 | 4 | Press 2 | Pickling with aqua regia (A) | 0.88 | 4.25 | 67 | 0.01 | 0.14 | EX |
| 9 | 5 | Press 2 | Pressing | 0.83 | 1.93 | 74 | <0.01 | 0.05 | EX |
| 10 | 6 | Cutting | Pickling with aqua regia (A) | 0.42 | 5.34 | 42 | <0.01 | 0.06 | EX |
| 11 | 6 | Cutting | Pickling with aqua regia (B) | 0.33 | 1.36 | 69 | 0.01 | 0.13 | EX |
| 12 | 7 (for comparison) | Cutting | Pickling with aqua regia (A) | 0.44 | 4.18 | 50 | >0.05 V after 200 hr. | 0.21 | CE |
| 13 | 8 | Press 2 | Pressing | 0.79 | 1.88 | 64 | <0.01 | 0.04 | EX |
| 14 | 9 (for comparison) | Cutting (cracking) | Pickling with aqua regia (A) | 0.41 | 8.01 | 48 | — | — | CE |
| 15 | 10 (for comparison) | Cutting (cracking) | Pickling with acid mixture (A) | 0.45 | 8.73 | 53 | — | — | CE |
| 16 | 11 | Press 2 | Pressing | 0.8 | 1.87 | 53 | <0.01 | 0.06 | EX |
| 17 | 11 | Press 3 | Pressing | 1.31 | 22.6 | 66 | >0.05 V after 200 hr. | 1.85 | EX |
| 18 | 12 | Cutting | Pickling with aqua regia (B) | 0.41 | 1.64 | 75 | 0.02 | 0.16 | EX |
| 19 | 12 | Press 2 | Pressing | 0.81 | 1.89 | 53 | <0.01 | 0.09 | EX |
| 20 | 12 | Cutting | Pickling with aqua regia (A) | 0.14 | 1.12 | 49 | <0.01 | 0.01 | EX |
| 21 | Carbon | Cutting | — | — | — | 81 | 0.02 | — | R |
| 22 | Gold-plated stainless steel | Cutting | — | — | — | 42 | >0.05 after 200 hr. | 2.2 | R |

*The surface roughness of the mold is as follows: Press 1: Ra = 0.8, Ry = 5.6, Press 2: Ra = 2.1, Ry = 16.5, Press 3: Ra = 3.3, Ry = 52.7 (μm).
**(B) and (A), respectively, represent pickling before and after the shaping of the separator.
EX: Example of the Invention
CE: Comparative Example
R: Reference (Generating Characteristic Test using Unit Cell)

A solid polymer fuel cell (unit cell) was prepared using an electrode film including Nafion (made by DuPont) as a polymer film for each separator. Air and ultra-high-purity hydrogen (purity: 99.9999 vol. %) were supplied to the cathode side and the anode side, respectively, at a rate of 500 cm³/min to perform durability test measure generating characteristics for 1000 hours. The generating characteristic was evaluated as an output voltage at a current density of 0.6 A/cm². When the decrease in the output voltage was 0.03 V or less, the separator was considered to be satisfactory. The cell body was maintained at 75±1° C. and the internal temperature of the cell was maintained at 78±2° C. The MEA and the carbon cloth were replaced with new ones for every test.

As shown in Table 5, the separators according to the invention had low contact resistance, which is comparable to or superior to that of the carbon separator (Separator 21), and exhibited high corrosion resistance, which is superior to that of the gold-plated separator (Separator 22). Furthermore, fuel cells including the separators according to the invention exhibited a small decrease of 0.03 V or less in output during the 1,000-hour generating test except for Separator 17 prepared by press forming and having a surface roughness Ry exceeding 20 μm. Separator 5 prepared by cutting and not subjected to surface roughening had high contact resistance. Separator 12 using the molybdenum-free steel (Steel 7) exhibited a significantly large decrease in output voltage after the 1,000-hour generating test. Separators 14 and 15 for comparison using Steels 9 and 10, respectively, which cracked during cutting, could not be evaluated.

EXAMPLE 3

Using steels having compositions shown in Table 6, hot-rolled steel sheets with a thickness of 5 mm or cold-rolled steel sheets with a thickness of 0.5 mm were prepared as in EXAMPLE 2.

Separators were prepared from these steel sheets as in EXAMPLE 2 and the surface roughnesses thereof were adjusted as in EXAMPLE 2.

These separators were annealed in a bright annealing furnace of an ammonia decomposed gas ($H_2$:75 vol. % and $N_2$:25 vol. %) at 900° C. to 1,100° C. for 30 seconds to 15 minutes to form respective BA films having different thicknesses.

As references, using a stainless steel sheet SUS304, stainless steel separators (Separator 20 in Table 7) having the same shape were prepared and plated with gold (thickness: about 0.05 μm) as in EXAMPLE 2. Furthermore, 5-mm thick carbon separators (Separator 19 in Table 7) having 17 rows of grooves with a width of 2 mm, a height of 2 mm, and a space of 2 mm on one side and 16 lines of grooves with a width of 1 mm, a height of 2 mm, and a space of 3 mm on the other side were prepared. Four separators were prepared for each steel sheet or material, or shaping process. The shaping processes are shown in Table 7.

TABLE 6

| | Composition (mass %) | | | | | | | | | | | | | |
|---|---|---|---|---|---|---|---|---|---|---|---|---|---|---|
| Steel | C | N | C + N | Si | Mn | P | S | Cr | Mo | Ag | V | Nb | Ti | Remarks |
| 1 | 0.0033 | 0.0031 | 0.0064 | 0.200 | 0.170 | 0.020 | 0.0030 | 26.3 | 1.7 | — | — | — | — | EX |
| 2 | 0.0062 | 0.0063 | 0.0125 | 0.310 | 0.250 | 0.022 | 0.0080 | 25.9 | 1.5 | — | 0.13 | — | — | EX |
| 3 | 0.0084 | 0.0080 | 0.0164 | 0.290 | 0.220 | 0.025 | 0.0040 | 26.1 | 1.8 | — | 0.09 | — | 0.22 | EX |
| 4 | 0.0026 | 0.0033 | 0.0059 | 0.180 | 0.190 | 0.021 | 0.0040 | 29.7 | 2.0 | 0.0040 | 0.11 | 0.42 | — | EX |
| 5 | 0.0027 | 0.0021 | 0.0048 | 0.200 | 0.110 | 0.018 | 0.0030 | 30.1 | 1.9 | 0.0021 | 0.11 | 0.16 | — | EX |
| 6 | 0.0033 | 0.0035 | 0.0068 | 0.190 | 0.150 | 0.020 | 0.0040 | 29.8 | 1.8 | 0.0041 | 0.15 | 0.20 | — | EX |
| 7 | 0.0029 | 0.0022 | 0.0051 | 0.220 | 0.210 | 0.019 | 0.0060 | 30.2 | — | 0.0280 | 0.09 | 0.24 | — | CE |
| 8 | 0.0044 | 0.0031 | 0.0075 | 0.270 | 0.170 | 0.017 | 0.0050 | 28.9 | 2.9 | 0.0050 | 0.13 | — | 0.18 | EX |
| 9 | 0.0520 | 0.0210 | 0.0730 | 0.240 | 0.210 | 0.028 | 0.0040 | 29.5 | 2.1 | 0.0110 | 0.09 | — | 0.20 | CE |
| 10 | 0.0250 | 0.0270 | 0.0520 | 0.260 | 0.190 | 0.024 | 0.0030 | 29.6 | 2.0 | 0.0140 | 0.10 | — | 0.19 | CE |
| 11 | 0.0031 | 0.0054 | 0.0085 | 0.240 | 0.220 | 0.019 | 0.0030 | 30.0 | 1.8 | 0.0040 | 0.10 | 0.31 | — | EX |
| 12 | 0.0003 | 0.0002 | 0.0005 | 0.002 | 0.001 | 0.001 | 0.0002 | 43.2 | 1.7 | 0.0080 | 0.009 | 0.09 | 0.07 | EX |

EX: Example of the Invention
CE: Comparative Example

TABLE 7

| Separator | Steel | Method for shaping separator | Surface roughening method* | Surface roughness Ra μm | Surface roughness Ry μm | BA film thickness (nm) | Contact resistance mΩ · cm² | Decrease in output per unit cell after 1,000 hours V/1,000 hr | Weight loss by corrosion g/m² | Remarks |
|---|---|---|---|---|---|---|---|---|---|---|
| 1 | 1 | Cutting | Pickling with acid | 0.12 | 0.94 | 24 | 75 | 0.02 | 0.42 | EX |
| 2 | 2 | Cutting | Pickling with acid | 0.31 | 2.97 | 31 | 66 | 0.01 | 0.35 | EX |
| 3 | 3 | Cutting | Pickling with acid | 0.07 | 0.51 | 28 | 85 | 0.02 | 0.39 | EX |
| 4 | 3 | Cutting | Non | 3.2 | 4.6 | 27 | 220 | Initial output voltage <0.3 V | 0.54 | CE |
| 5 | 4 | Cutting | Pickling with aqua regia | 0.15 | 1.02 | 92 | 58 | <0.01 | 0.33 | EX |
| 6 | 4 | Press | Pickling with aqua regia | 0.86 | 2.54 | 48 | 49 | <0.01 | 0.38 | EX |
| 7 | 4 | Cutting | Pickling with aqua regia | 0.15 | 1.02 | 0 | 62 | <0.01 | 1.84 | EX |
| 8 | 4 | Cutting | Pickling with aqua regia | 0.15 | 1.02 | 384 | 225 | Initial output voltage <0.3 V | 0.2 | CE |
| 9 | 5 | Press | Pressing | 0.83 | 1.93 | 53 | 78 | <0.01 | 0.37 | EX |
| 10 | 6 | Cutting | Pickling with aqua regia | 0.42 | 5.34 | 42 | 49 | <0.01 | 0.41 | EX |

TABLE 7-continued

| Separator | Steel | Method for shaping separator | Surface roughening method* | Surface roughness Ra μm | Surface roughness Ry μm | BA film thickness (nm) | Contact resistance mΩ·cm² | Decrease in output per unit cell after 1,000 hours V/1,000 hr | Weight loss by corrosion g/m² | Remarks |
|---|---|---|---|---|---|---|---|---|---|---|
| 11 | 6 | Press | Pickling with acid | 0.64 | 2.44 | 38 | 46 | 0.01 | 0.38 | EX |
| 12 | 7 (forcomparison) | Cutting | Pickling with aqua regia | 0.44 | 4.18 | 27 | 62 | >0.05 V after 650 hr. | 1.14 | CE |
| 13 | 8 | Press | Pressing | 0.79 | 1.88 | 29 | 69 | <0.01 | 0.51 | EX |
| 14 | 9 (forcomparison) | Cutting (cracking) | Pickling with aqua regia | 0.41 | 8.01 | 33 | 64 | — | — | CE |
| 15 | 10 (forcomparison) | Cutting (cracking) | Pickling with acid mixture | 0.45 | 8.73 | 28 | 48 | — | — | CE |
| 16 | 11 | Press | Pressing | 0.80 | 1.87 | 37 | 63 | <0.01 | 0.49 | EX |
| 17 | 12 | Press | Pressing | 0.81 | 1.89 | 35 | 58 | <0.01 | <0.01 | EX |
| 18 | 12 | Cutting | Pickling with aqua regia | 0.14 | 1.12 | 34 | 67 | <0.01 | <0.01 | EX |
| 19 | Carbon | Cutting | — | — | — | — | 74 | 0.02 | — | R |
| 20 | Gold-plated stainless steel | Cutting | — | — | — | — | 38 | >0.05 V after 600 hr. | 5.6 | R |

*The surface roughening is performed by pickling after the shaping of the separator.
EX: Example of the Invention
CE: Comparative Example
R: Reference

TABLE 8

| Separator | Steel | Method for shaping separator | Surface roughening method* | Surface roughness Ra μm | Surface roughness Ry μm | BA film thickness (nm) | Contact resistance mΩ·cm² | Decrease in output per cell after 1,000 hours V/1,000 hr | Occurrence of corrosion | Remarks |
|---|---|---|---|---|---|---|---|---|---|---|
| 21 | 4 | Cutting | Pickling with aqua regia | 0.15 | 1.02 | 24 | 71 | <0.01 | Non | EX |
| 22 | 4 | Press | Pickling with acid mixture | 0.68 | 2.15 | 48 | 80 | <0.01 | Non | EX |
| 23 | 4 | Press | Pickling with aqua regia | 0.52 | 2.97 | 31 | 80 | <0.01 | Non | EX |
| 24 | 4 | Cutting | Pickling with aqua regia | 0.15 | 1.02 | 0 | 58 | >0.05 V after 6,000 hr. | Pit corrosion | EX |

*The surface roughening is performed by pickling after the shaping of the separator.
EX: Example of the Invention The contact resistance of each separator was measured as in EXAMPLE 2. The corrosion resistance test was performed in a more severe environment as follows: A carbon sheet was placed between two grooved separators and these were subjected to a linear pressure of 9.8 N·m to provide a more severe environment compared with that in EXAMPLE 2. These were immersed in 10 mass percent sulfuric acid at 80° C. for 90 days. The average weight loss of the two separators per unit area was measured. Furthermore, as in EXAMPLE 2, generating characteristics for 1,000 hours and 10,000 hours of unit fuel cells including the separators were measured. The BA film thickness was measured as in EXPERIMENT 2.

As shown in Table 7, the separators according to the invention had low contact resistance, which is comparable to or superior to that of the carbon separator (Separator 19) and exhibited high corrosion resistance, which is superior to that of the gold-plated separator (Separator 20). Furthermore, fuel cells including the separators according to the invention exhibited a small decrease of 0.03 V or less in output during the 1,000-hour generating test. Separator 4 prepared by cutting and not subjected to surface roughening and Separator 8 having a thick BA film exhibited high contact resistance. Separator 12 using the molybdenum-free steel (Steel 7) exhibited a significantly large decrease in output voltage after 650 hours. Separators 14 and 15 for comparison using Steels 9 and 10, respectively, which cracked during cutting, could not be evaluated.

The results of a testing time of 10,000 hours are shown in Table 8.

The separators having the BA films exhibited a decrease of 0.01 V or less in output voltage and no corrosion was observed on the disassembled separators. In contrast, the separators having no BA films exhibited a small decrease in output voltage after 1,000 hours but a large decrease exceeding 0.03 V over about 6,000 hours.

As described above, the stainless steel separator according to the invention suitable for use in solid polymer fuel cells has small contact resistance and high corrosion resistance which are comparable to those of known carbon separators and gold-plated stainless steel separators. Since this stainless steel separator is inexpensive compared with the carbon separators, low-cost fuel cells can be fabricated using the stainless steel separators. The stainless steel according to the invention can also be used as conductive stainless steel electronic components, in addition to the separators.

What is claimed is:

1. A stainless steel separator for fuel cells having gas channels including grooves and projections for partitioning the grooves, the separator having a composition comprising:

about 0.03 mass percent or less of carbon;

about 0.03 mass percent or less of nitrogen, the total content of carbon and nitrogen being about 0.03 mass percent or less;

about 16 mass percent to about 45 mass percent chromium, and about 0.1 mass percent to about 3.0 mass percent molybdenum, wherein the separator has a contact resistance of about 100 mΩ·cm$^2$ or less and the projections have an arithmetic average surface roughness Ra in the range of about 0.01 to about 1.0 μm and a maximum height Ry in the range of about 0.01 to about 20 μm.

2. The stainless steel separator according to claim 1, further comprising about 0.001 to about 0.1 mass percent silver.

3. The stainless steel separator according to claim 1, further comprising about 1.00 mass percent or less of silicon and about 1.00 mass percent or less of manganese.

4. The stainless steel separator according to claim 1, further comprising about 0.005 to about 0.5 mass percent vanadium.

5. The stainless steel separator according to claim 1, further comprising at least one of titanium and niobium in a total amount of about 0.01 to about 0.5 mass percent.

6. A solid polymer fuel cell comprising a polymer film, electrodes, and the separator according to claim 1.

7. A stainless steel separator for fuel cells having gas channels including grooves and projections for partitioning the grooves, the separator having a composition comprising:

about 0.03 mass percent or less of carbon;

about 0.03 mass percent or less of nitrogen, the total content of carbon and nitrogen being about 0.03 mass percent or less;

about 16 mass percent to about 45 mass percent chromium, and about 0.1 mass percent to about 3.0 mass percent molybdenum, wherein the separator has a contact resistance of about 100 mμ·cm$^2$ or less; and a BA film having a thickness in the range of about 10 to about 300 nm on a surface of at least some of the projections.

8. The stainless steel separator according to claim 7, wherein the projections have an arithmetic average surface roughness Ra in the range of about 0.01 to about 1.0 μm and a maximum height Ry in the range of about 0.01 to about 20 μm.

9. The stainless steel separator according to claim 7, further comprising about 0.001 to about 0.1 mass percent silver.

10. The stainless steel separator according to claim 7, further comprising about 1.00 mass percent or less of silicon and about 1.00 mass percent or less of manganese.

11. The stainless steel separator according to claim 7, further comprising about 0.005 to about 0.5 mass percent vanadium.

12. The stainless steel separator according to claim 7, further comprising at least one of titanium and niobium in a total amount of about 0.01 to about 0.5 mass percent.

13. A solid polymer fuel cell comprising a polymer film, electrodes, and the separator according to claim 7.

14. A method for making a stainless steel separator for fuel cells having gas channels including grooves and projections for partitioning the grooves comprising:

hot-rolling a slab to form a hot-rolled sheet having a predetermined thickness, the slab comprising about 0.03 mass percent or less of carbon, about 0.03 mass percent or less of nitrogen, the total content of carbon and nitrogen being about 0.03 mass percent or less, about 15 mass percent to about 45 mass percent chromium, and about 0.1 mass percent to about 3.0 mass percent molybdenum;

annealing and pickling the hot-rolled sheet; and cutting the hot-rolled sheet to form the stainless steel separator.

15. The method according to claim 14, wherein surface roughness of the projection is adjusted so that the arithmetic average surface roughness Ra is in the range of about 0.01 to about 1.0 μm and the maximum height Ry is in the range of about 0.01 to about 20 μm.

16. The method according to claim 15, wherein surface roughness is adjusted by pickling the separator in aqua regia or an acid mixture before or after cutting.

17. The method according to claim 14, wherein the stainless steel separator further comprises about 0.001 to about 0.1 mass percent silver.

18. The method according to claim 14, wherein the stainless steel separator further comprises about 1.00 mass percent or less of silicon and about 1.00 mass percent or less of manganese.

19. The method according to claim 14, wherein the stainless steel separator further comprises about 0.005 to about 0.5 mass percent vanadium.

20. The method according to claim 14, wherein the stainless steel separator further comprises at least one of titanium and niobium in a total amount of about 0.01 to about 0.5 mass percent.

21. The method according to claim 14, wherein a BA film having a thickness in the range of about 10 to about 300 nm is formed on surface of at least some the projections of the stainless steel separator.

22. A method for making a stainless steel separator for fuel cells having gas channels including grooves and projections for partitioning the grooves comprising:

hot-rolling a slab to form a hot-rolled sheet having a predetermined thickness, the slab comprising about 0.03 mass percent or less of carbon, about 0.03 mass percent or less of nitrogen, the total content of carbon and nitrogen being about 0.03 mass percent or less, about 16 mass percent to about 45 mass percent chromium, and about 0.1 mass percent to about 3.0 mass percent molybdenum;

annealing and pickling the hot-rolled sheet;

cold-rolling the hot-rolled sheet to form a cold-rolled sheet having a predetermined thickness;

press-forming the cold-rolled sheet to form the stainless steel separator, wherein surface roughness of projections applied to the sheet is adjusted so that the arithmetic average surface roughness Ra is in the range of about 0.01 to about 1.0 μm and the maximum height Ry is in the range of about 0.01 to about 20 μm.

23. The method according to claim 22, further comprising annealing and pickling the cold-rolled steel sheet.

24. The method according to claim 22 wherein surface roughness is adjusted during press-forming or by pickling the separator in aqua regia or an acid mixture before or after press-shaping.

25. The method according to claim 24 wherein the surface roughness is adjusted by press-forming wherein a mold used in press-forming has an arithmetic average surface roughness Ra in the range of about 0.01 to about 2.0 μm and a maximum height Ry in the range of about 0.01 to about 50 μm.

26. The method according to claim 22, wherein the stainless steel separator further comprises about 0.001 to about 0.1 mass percent silver.

27. The method according to claim 22, wherein the stainless steel separator further comprises about 1.00 mass percent or less of silicon and about 1.00 mass percent or less of manganese.

28. The method according to claim 22, wherein the stainless steel separator further comprises about 0.005 to about 0.5 mass percent vanadium.

29. The method according to claim 22, wherein the stainless steel separator further comprises at least one of titanium and niobium in a total amount of about 0.01 to about 0.5 mass percent.

30. The method according to claim 22, wherein a BA film having a thickness in the range of about 10 to about 300 nm is formed on surface of at least some the projections of the stainless steel separator.

* * * * *